Feb. 17, 1948.    H. W. MORGAN    2,436,117
SECTIONAL FROZEN FOOD LOCKER PLANT
Filed July 30, 1943    5 Sheets-Sheet 1
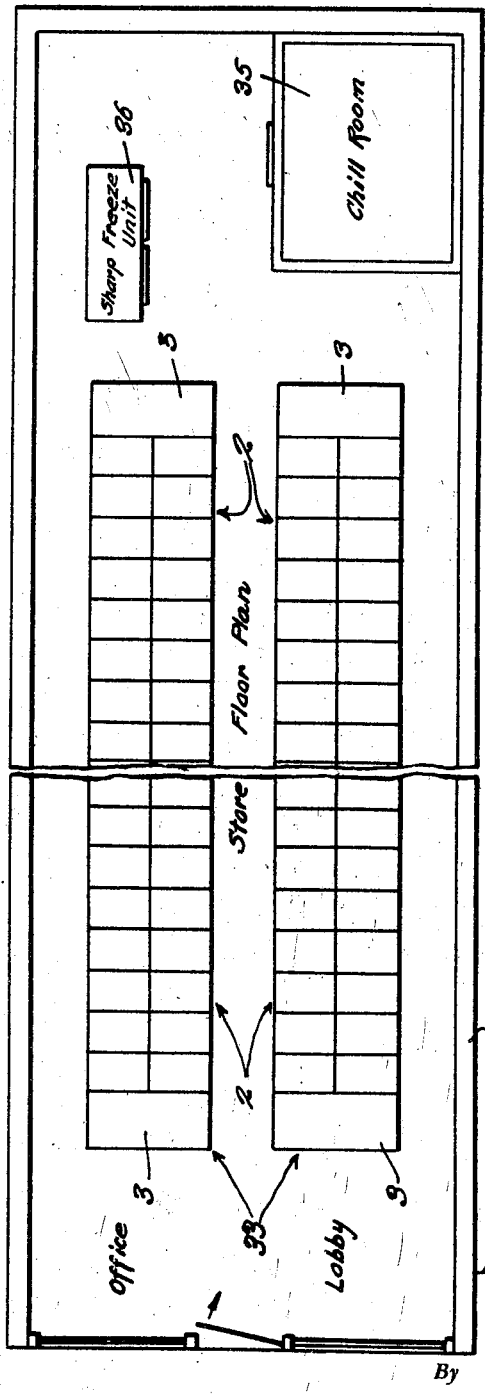
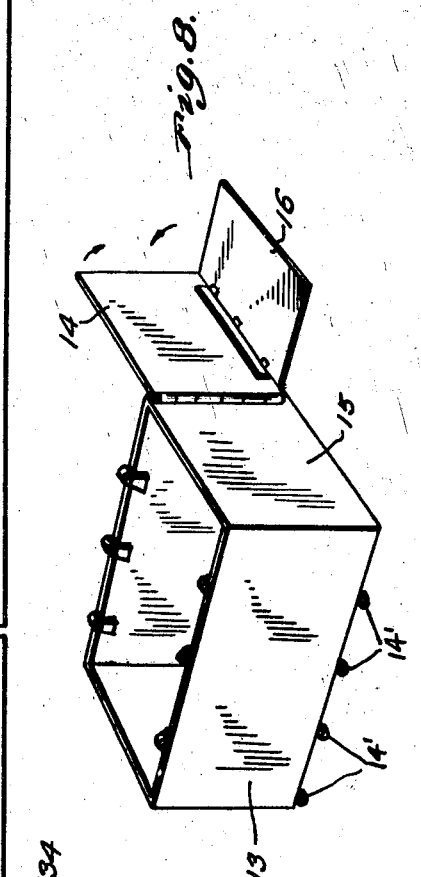
Inventor
Herbert W. Morgan
By
Clarence A. O'Brien
and Harvey B. Jacobson
Attorneys

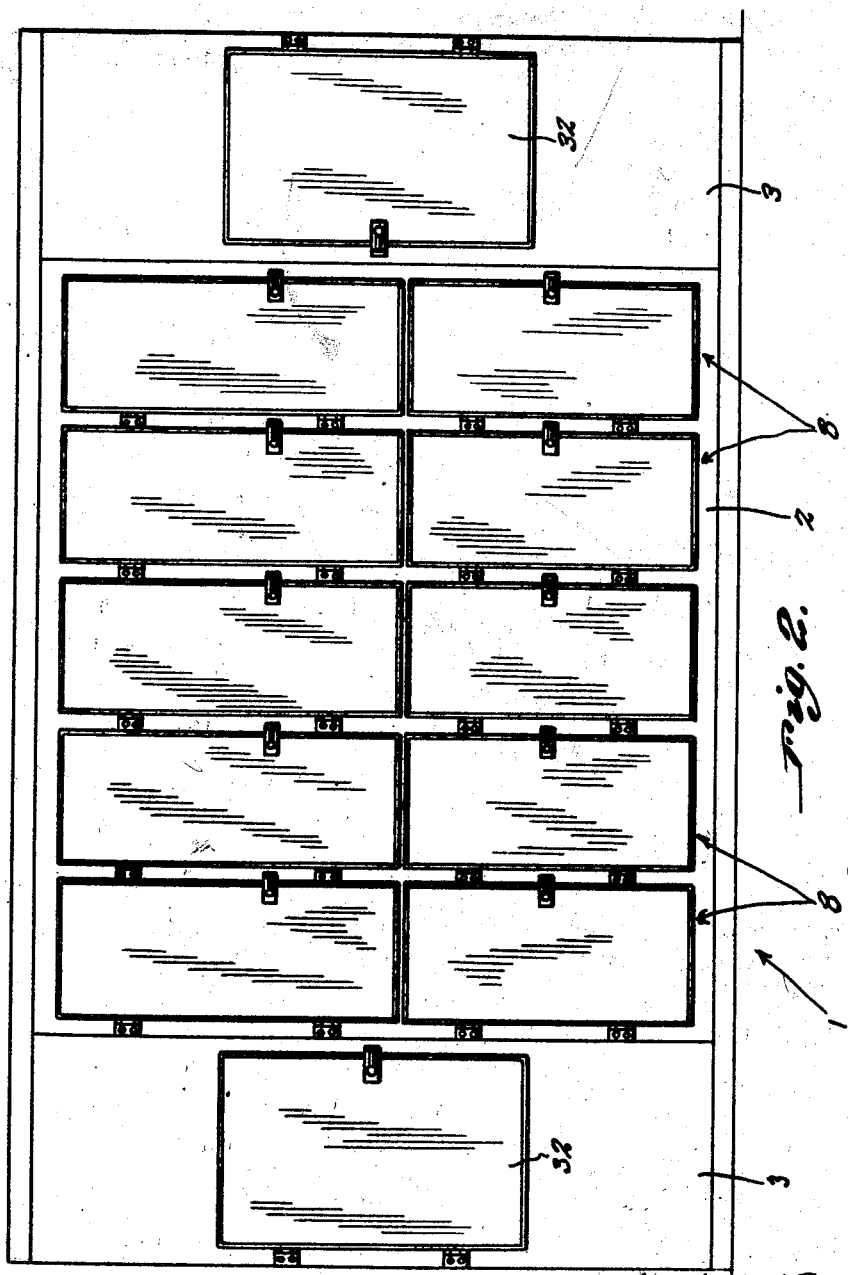

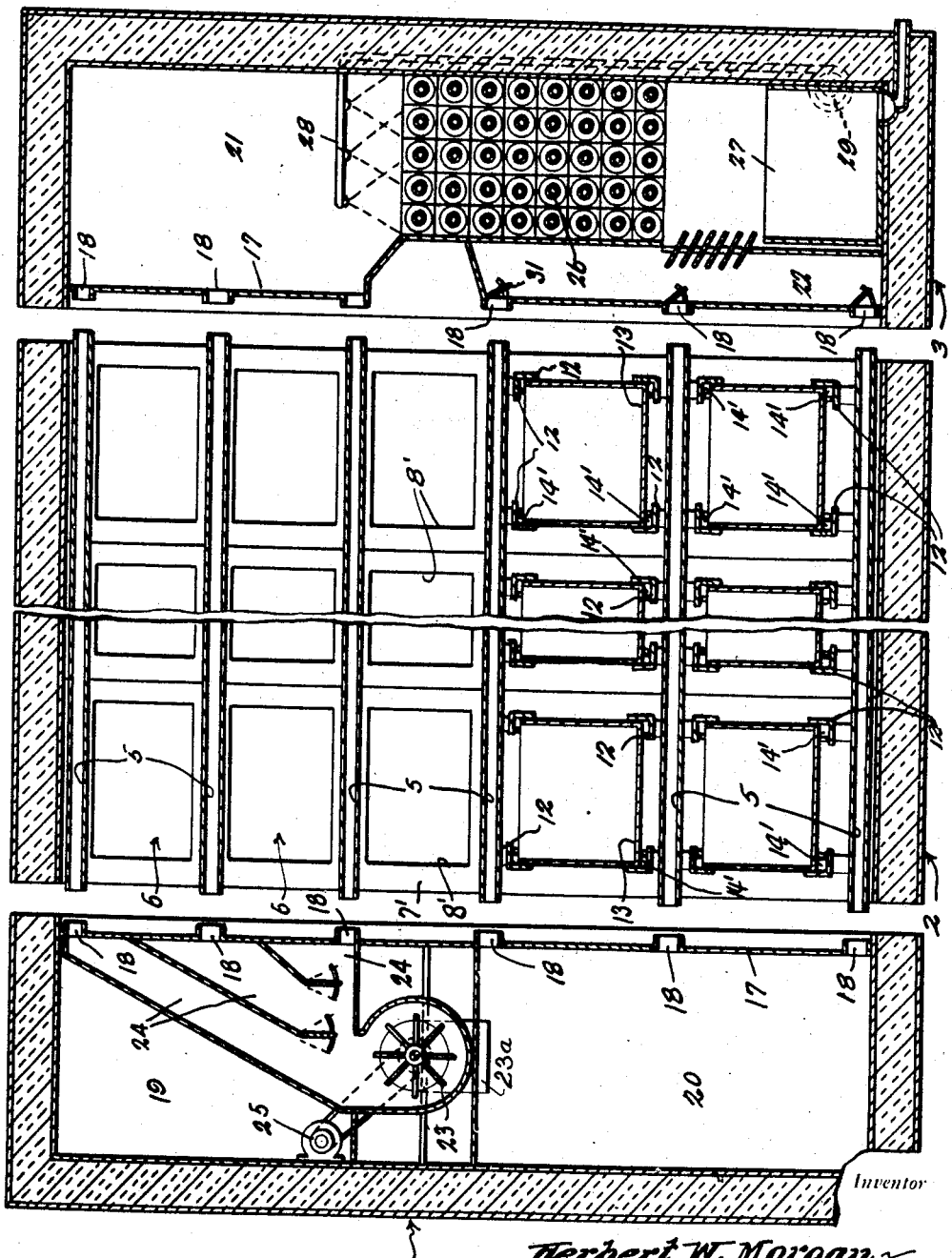

Feb. 17, 1948. H. W. MORGAN 2,436,117
SECTIONAL FROZEN FOOD LOCKER PLANT
Filed July 30, 1943 5 Sheets-Sheet 4
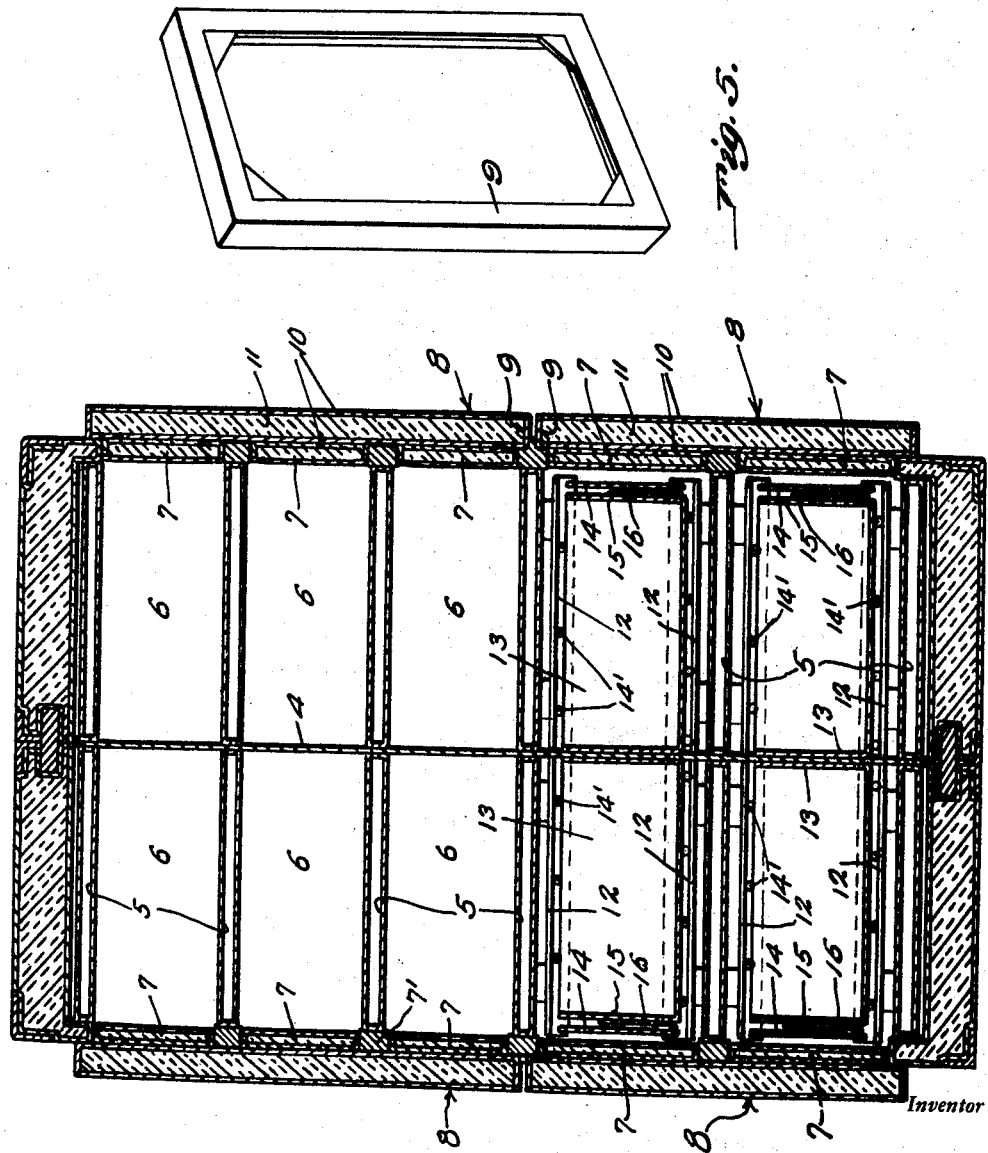
Inventor
Herbert W. Morgan
By Clarence A. O'Brien
and Harvey B. Jacobson
Attorneys

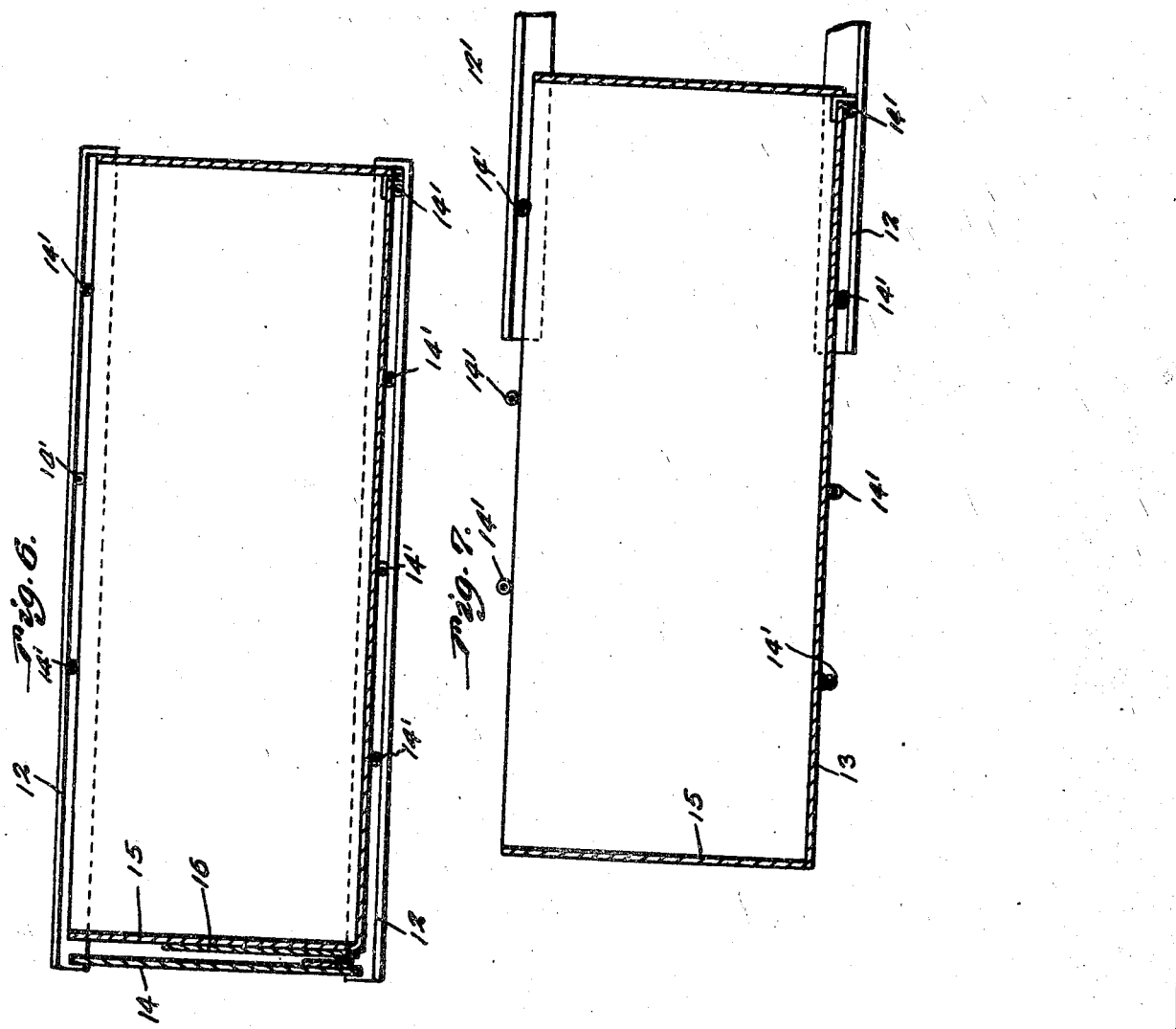

Patented Feb. 17, 1948

2,436,117

UNITED STATES PATENT OFFICE 2,436,117

SECTIONAL FROZEN FOOD LOCKER PLANT

Herbert W. Morgan, Webster Groves, Mo., assignor to Hussmann Refrigerator Co., a corporation of Delaware Application July 30, 1943, Serial No. 496,811

4 Claims. (Cl. 62—102)

The present invention relates to new and useful improvements in frozen food locker plants of the mechanical, air-cooled type, and has for its primary object to provide, in a manner as hereinafter set forth, a device of this character comprising a multiplicity of compartments adapted to be selectively opened, the construction and arrangement being such as to prevent the loss of any of the cooling air, which is used repeatedly.

Another very important object of the invention is to provide a sectional frozen food locker plant of the aforementioned character which embodies a unique arrangement for cooling, circulating and controlling the air.

Still another important object of the invention is to provide a sectional frozen food locker plant of the character described comprising a novel construction of a sectional cabinet which is adapted to be economically transported to the desired location and erected or assembled.

Other objects of the invention are to provide a sectional frozen food locker plant of the character set forth which will be comparatively simple in construction, strong, durable, highly efficient and reliable in use, compact, attractive in appearance, and which may be manufactured and installed at low cost.

All of the foregoing, and still further objects and advantages of the invention will become apparent from a study of the following specification, taken in connection with the accompanying drawing wherein like characters of reference designate corresponding parts throughout the several views, and wherein:

Figure 1 is a plan view of a store in which two plants in accordance with the present invention have been installed.

Figure 2 is an elevational view of the plant.

Figure 3 is a view in vertical longitudinal section through the plant before the sections thereof are assembled in their final positions.

Figure 4 is a cross-sectional view through the storage section.

Figure 5 is a perspective view of one of the frame members.

Figure 6 is a view in vertical section through one of the slidable drawers, showing same in closed position.

Figure 7 is a view in vertical section through one of the drawers, showing same pulled out to open position.

Figure 8 is a perspective view of one of the slidable drawers with the folding shelf in open position thereon.

Referring now to the drawing in detail, it will be seen that the embodiment of the invention which has been illustrated comprises an elongated cabinet of suitable dimensions which is designated generally by reference numeral 1, said cabinet including sectional side, bottom and top walls, as shown to advantage in Figure 4 of the drawing. It will be observed that the cabinet 1 is of heat-insulating construction. The cabinet 1 includes an intermediate storage section 2 and end sections 3. The installation may comprise any desired number of the intermediate sections 2.

The storage section 2 of the cabinet 1 has mounted therein a vertical partition 4 which extends substantially from end to end thereof. Substantialy flat, horizontal air ducts 5 divide the storage section 2 of the refrigerator into a multiplicity of chambers 6 in conjunction with the partition 4. The side wall structures 7' of the section 2 have formed therein openings 8' which communicate with the chambers 6. Each of the chambers 6 is provided with a hinged access door 7 for closing the opening 8'. Main or master outer doors 8 are hingedly mounted on the side wall structure of the cabinet and are adapted to close over a plurality of the inner doors 7. For example, the lower doors 8 are of a size to cover two of the doors 7 of a tier and the upper doors 8 are of a size to take care of the three upper doors 7 of the tier. The outer doors 8 include metallic frames 9 having panels 10 mounted therein, said doors further including each a suitable heat-insulating filler 11. The inner doors 7 are also of heat-insulating construction.

In the comparatively small upper chambers 6, the food, et cetera, placed therein rest directly on the ducts 5. However, in the two lowermost chambers 6 of each tier, transverse tracks 12 are mounted on the ducts 5 and extend from the partition 4 to the doors 7. Slidable drawers 13 are operable in the lower chambers, said drawers being equipped with rollers 14' which travel on the tracks 12. Substantially plate-like brackets 14 are hingedly mounted for swinging movement in a horizontal plane on the outer end walls 15 of the drawers 13. Article-supporting shelves 16 are hingedly mounted for swinging movement in a vertical plane on the brackets 14.

Walls 17 in the inner end portions of the sections 3 also constitute the end walls of the storage section 2. The walls 17 have formed therein elongated openings 18 which slidably accommodate the end portions of the air ducts 5. One of the sections 3 comprises upper and lower compartments 19 and 20, respectively, and the other of said sections comprises upper and lower compartments 21 and 22, respectively. The compartments 19 and 21 communicate with each other through certain of the ducts 5 and the lower compartments 20 and 22 communicate with each other through the remaining ducts 5.

Mounted in the lower portion of the compartment 19 and communicating through its intake 23ª with the compartment 20 is a centrifugal blower 23, the discharge side of which communicates with the compartment 21 through conduits 24 and certain of the ducts 5. An electric motor 25 drives the blower 23.

Mounted in the compartment 22 is the evaporator coil 26 of a mechanical refrigerating system through which coil the air must pass to return to the compartment 20. A brine tank 27 is provided below the coil unit 26. A spray 28 is mounted above the coil unit 26. The spray 28 receives brine from the tank 27 through a pump 29 and discharges said brine on the coil unit 26 for preventing the formation of frost thereon. Dampers 31 are provided for controlling and regulating the circulation of the cooling air through the system. Doors 32 provide access to the end sections 3 of the installation.

It is thought that the operation of the invention will be readily apparent from a consideration of the foregoing. Briefly, with the dampers 31 at the desired adjustment, the blower 23 draws air from the compartment 20 and forces said air through the conduits 24 and the upper ducts 5 which are in communication therewith to the compartment 21. This air passes downwardly through the coil unit 26 where it is recooled and returns to the compartment 20 from the compartment 22 through the lower ducts 5 which communicate therewith. The cycle is then repeated. The doors 8 are opened to expose the inner doors 7 for access to the desired compartments 6. Suitable key-operated locks may be provided for any or all of the doors. As the cooling air never enters the chambers 6, none of said air is lost when said chambers are opened. The construction and arrangement is such that any desired number of the storage sections 2 may be interposed between the end sections 3. When the slidable drawers 13 are pulled outwardly to open position, the brackets 14 are swung laterally to one side thereof and the shelves 16 are swung downwardly, as seen in Figure 8 of the drawing, for providing a convenient support for articles which the person may desire to place thereon.

In Figure 1 of the drawing, two parallel installations 33 are shown extending longitudinally in a store 34. A chill room 35 and a sharp freezing unit 36 are provided in the rear end portion of the store beyond the installations 33.

It is believed that the many advantages of a sectional frozen food locker plant constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

1. A sectional frozen food locker plant comprising an intermediate section and separate end sections closing the ends of the intermediate section, and a closed cold air refrigerating system including separate vertically spaced air ducts extending through the intermediate section from end to end thereof without communicating therewith and communicating at their end with the end sections, said air ducts dividing said intermediate section into a plurality of vertically spaced chambers, means enclosed in one of the end sections for circulating air through the ducts and said end sections, and means in the other of the end sections for cooling the air.

2. A sectional frozen food locker plant of the character described comprising a cabinet including an intermediate section and separate end sections, closing the ends of the intermediate section, an imperforate vertical partition in the intermediate section extending from end to end thereof, separate vertically spaced horizontal air ducts in the intermediate section extending from end to end thereof and communicating with the end sections, said ducts and partition forming the top, bottom and inner walls of a multiplicity of vertically spaced chambers in the intermediate section, there being no communication between said ducts and chambers, doors on said intermediate section providing access to the chambers through the outer ends thereof, a blower enclosed in one of the end sections for circulating air through the ducts and said end sections, and means enclosed in the other end section for cooling the air.

3. A sectional frozen food locker plant of the character described comprising a cabinet of heat-insulating construction including intermediate and end sections, walls in the end sections closing the ends of the intermediate section, a vertical partition in the intermediate section extending between the walls, substantially flat air ducts mounted horizontally at vertically spaced points in the intermediate section and extending between the walls and communicating with the end sections, said ducts, in conjunction with the partition, providing a multiplicity of chambers in the intermediate section, doors providing access to the chambers, the end sections including upper and lower compartments, certain of the ducts communicating with the upper compartments and the remaining ducts communicating with the lower compartments, there being no communication between said ducts and chambers, a blower mounted in one of the end sections for circulating air through the ducts and said end sections, and mechanical refrigerating means in the other end section for cooling the air as it passes therethrough.

4. A self-contained refrigerated food locker cabinet comprising end compartments and food lockers positioned therebetween, a plurality of vertically spaced air ducts extending from end compartment to end compartment without communicating with said food lockers and forming the top and bottom walls thereof, a mechanical refrigerating coil in one of said end compartments for cooling the air therein, means in the other of said end compartments for circulating the air through said compartments and ducts, and means in the coil containing end compartment for spraying brine over the coil therein for defrosting the same.

HERBERT W. MORGAN.

REFERENCES CITED

The following references are of record in the file of this patent:

UNITED STATES PATENTS

| Number | Name | Date |
|---|---|---|
| 1,812,102 | Lundgaard | June 30, 1931 |
| 1,947,422 | Baker | Feb. 20, 1934 |
| 2,075,838 | Torrey | Apr. 6, 1937 |
| 2,122,501 | Thomas | July 5, 1938 |
| 2,190,388 | Sparks | Feb. 13, 1940 |
| 2,198,239 | Baird | Apr. 23, 1940 |
| 2,226,962 | Baird | Dec. 31, 1940 |
| 2,259,803 | Cumming | Oct. 21, 1941 |
| 2,375,688 | Quatman | May 8, 1945 |